United States Patent
Fujimoto et al.

(10) Patent No.: US 9,287,543 B2
(45) Date of Patent: Mar. 15, 2016

(54) POROUS FILM, SEPARATOR FOR ELECTRIC STORAGE DEVICE, AND ELECTRIC STORAGE DEVICE

(75) Inventors: Soichi Fujimoto, Otsu (JP); Takuya Kuma, Otsu (JP); Masatoshi Ohkura, Otsu (JP)

(73) Assignee: Toray Industries, Inc. (JP)

( * ) Notice: Subject to any disclaimer, the term of this patent is extended or adjusted under 35 U.S.C. 154(b) by 251 days.

(21) Appl. No.: 13/983,138

(22) PCT Filed: Feb. 2, 2012

(86) PCT No.: PCT/JP2012/052427
§ 371 (c)(1),
(2), (4) Date: Aug. 1, 2013

(87) PCT Pub. No.: WO2012/105660
PCT Pub. Date: Aug. 9, 2012

(65) Prior Publication Data
US 2013/0316246 A1     Nov. 28, 2013

(30) Foreign Application Priority Data

Feb. 3, 2011   (JP) ................................ 2011-021319
Dec. 15, 2011  (JP) ................................ 2011-274129

(51) Int. Cl.
| | |
|---|---|
| *H01M 2/16* | (2006.01) |
| *C08J 5/18* | (2006.01) |
| *B29C 55/00* | (2006.01) |
| *B29C 55/12* | (2006.01) |
| *H01M 10/0525* | (2010.01) |
| *B29K 23/00* | (2006.01) |
| *B29K 105/00* | (2006.01) |
| *B29K 105/04* | (2006.01) |

(52) U.S. Cl.
CPC ........... *H01M 2/1653* (2013.01); *B29C 55/005* (2013.01); *B29C 55/12* (2013.01); *C08J 5/18* (2013.01); *H01M 2/162* (2013.01); *B29K 2023/10* (2013.01); *B29K 2105/0005* (2013.01); *B29K 2105/04* (2013.01); *C08J 2323/12* (2013.01); *C08J 2423/08* (2013.01); *C08J 2423/10* (2013.01); *C08J 2423/20* (2013.01); *H01M 10/0525* (2013.01)

(58) Field of Classification Search
USPC ................................................. 429/247, 249
IPC ............... H01M 2/16; C08L 2207/06
See application file for complete search history.

(56) References Cited

U.S. PATENT DOCUMENTS

| | | | |
|---|---|---|---|
| 3,679,538 A | 7/1972 | Druin et al. | |
| 3,801,404 A | 4/1974 | Druin et al. | |
| 5,134,174 A | 7/1992 | Xu et al. | |
| 6,596,814 B2 * | 7/2003 | Kim et al. | ..................... 525/191 |
| 2005/0031943 A1 | 2/2005 | Call | |
| 2007/0148538 A1 | 6/2007 | Call | |

FOREIGN PATENT DOCUMENTS

| | | |
|---|---|---|
| JP | 55-032531 B1 | 6/1980 |
| JP | 55-131028 A | 10/1980 |
| JP | 63-199742 A | 8/1988 |
| JP | 5-310665 | 11/1993 |
| JP | 06-100720 A | 4/1994 |
| JP | 6-140016 | 5/1994 |
| JP | 09-255804 A | 9/1997 |
| JP | 2003-231772 A | 8/2003 |
| JP | 2005-056851 A | 3/2005 |
| JP | 2007-95372 | 4/2007 |
| JP | 2008-120931 A | 5/2008 |
| JP | 2010-219037 | 9/2010 |
| JP | 2010-242060 A | 10/2010 |
| WO | 2010/107023 A1 | 9/2010 |
| WO | 2012/099149 A1 | 7/2012 |

OTHER PUBLICATIONS

Sadeghi, F. et al., "Study of Polypropylene Morphology Obtained from Blown and Cast Film Processes: Initial Morphology Requirements for Making Porous Membrane by Stretching," *Journal of Plastic Film & Sheeting*, Jul. 2005, vol. 21, pp. 199-216.
Supplementary European Search Report dated May 30, 2014 from corresponding European Patent Application No. 12741511.5.
The First Chinese Office Action dated Mar. 21, 2014 along with an English translation from corresponding Chinese Application No. 201280007474.8.
The Second Chinese Office Action dated Oct. 14, 2014 along with an English translation from corresponding Chinese Application No. 201280007474.8.

* cited by examiner

*Primary Examiner* — Patrick Ryan
*Assistant Examiner* — Julian Anthony
(74) *Attorney, Agent, or Firm* — DLA Piper LLP (US)

(57) ABSTRACT

A porous film that excels when used as a separator for a lithium-ion battery not only in separator followability to expansion and contraction of an electrode during charging and discharging, but also in charging and discharging cycle characteristics. The porous film, when the thickness of a circular region having a diameter of 10 mm as an initial thickness $t_0$ after a load of 50 g is applied onto the circular region for 10 seconds, as a thickness t after a load of 500 g is subsequently applied onto the same region for 10 seconds, and as a thickness $t_1$ after 10 seconds has passed after the load applied onto the same region is subsequently changed to 50 g, the thickness change rate is 10% to 50%, and the thickness ($t_1$) recovery rate is 80% to 99.9%.

8 Claims, No Drawings

POROUS FILM, SEPARATOR FOR ELECTRIC STORAGE DEVICE, AND ELECTRIC STORAGE DEVICE

TECHNICAL FIELD

This disclosure relates to a porous film that, when used as a separator for a lithium-ion battery, excels in separator followability to expansion and contraction of an electrode during charging and discharging, and also excels in charging and discharging cycle characteristics. In particular, this disclosure relates to a porous film that can follow electrode deformations during charging and discharging of a battery of high-capacity type by having a high thickness change rate when a load is applied to the porous film, and that excels in the cycle characteristics by being capable of maintaining a high recovery rate when the load is repeatedly applied and released, and thus that can be suitably used for a separator of an electric storage device.

BACKGROUND

A porous film is used for a variety of applications such as various separators for batteries and electrolytic capacitors, various separation membranes (filters), absorbent goods as typified by diapers and feminine hygiene products, waterproof moisture-permeable members for clothing and medical purposes, members for thermal receiving paper, and ink receptor members. A porous film based on polyolefin as typified by polypropylene and polyethylene is mainly used. The porous polyolefin film is used particularly as a separator for an electric storage device because it has features such as high permeability and high porosity.

The electric storage device is one of very important electrical devices that support the current ubiquitous society because it is capable of producing electrical energy anytime and anywhere. Meanwhile, the spread of portable devices such as video cameras, personal computers, cellular phones, portable music players, and handheld game consoles, is increasing the need for an increase in capacity and reduction in size and weight of the electric storage device (particularly, of a secondary battery). A lithium-ion battery, among others, has higher energy density and higher output density both per volume and per mass than those of other electric storage devices, so that the demand for the lithium-ion battery as an electric storage device satisfying the above mentioned need is greatly increasing.

Furthermore, in recent years, there have arisen problems such as global warming, air pollution, exhaustion of petroleum, and $CO_2$ emission control, and an environmental load of automobiles is becoming a large problem. Therefore, studies for development and practical application are being actively carried out regarding electric vehicles (EVs), hybrid electric vehicles (HEVs), fuel-cell vehicles (FCVs), and the like that can be some of solutions for environmental measures (improvement of cleanliness), energy saving measures (improvement in fuel economy), next generation fuel measures (new energy development), and the like. Emphases have been put on, for example, the lithium-ion battery and an electric double layer capacitor as main power sources or auxiliary power sources of these vehicles, and application thereof is being studied at a rapid pace.

In the case of using the porous film as a separator for an electrolytic device, particularly for the lithium-ion battery, one of the requirements is that the porous film needs to have a high thickness recovery rate when a load is applied thereto and released therefrom. A negative electrode of the lithium-ion battery expands and contracts in the thickness direction of the separator each time lithium is stored and released during charging and discharging. The separator needs to follow the expansion and contraction of the negative electrode and change in thickness, and when the separator that is compressed during charging does not recover the original thickness during discharging, there have been cases in which resistance increases, or a short circuit is likely to occur due to particles that have come off or the like.

In some cases, the separator is required to have a large thickness change rate to follow the expansion and contraction of the negative electrode. For example, when the lithium-ion battery uses an alloy-based negative electrode that is expected to have high energy density, but has particularly large expansion and contraction values, there has been a problem that a small thickness change rate leaves no room for the expansion of the negative electrode and thus lowers the battery performance.

Moreover, the separator that follows the negative electrode having the large expansion and contraction values needs to maintain the high thickness recovery rate during any number of times of repetition of charging and discharging. There has been a possibility of occurrence of a problem that a reduction in the thickness recovery rate of the separator with each repetition of charging and discharging gradually increases the resistance relative to an initial value, in other words, deteriorates the cycle characteristics.

Various methods have been developed to form pores of the polyolefin-based film used as the porous film. The methods of forming pores are broadly classified into a wet method and a dry method. As the wet method, a method has been developed (for example, refer to Japanese Laid-open Patent Publication Nos. 55-131028 and 2003-231772) that involves using polyolefin as a matrix resin, adding and mixing a substance to be extracted after forming the resin into a sheet, and then extracting only the substance thus added using a good solvent of the substance to generate pores in the matrix resin. However, the porous film obtained with this method has a three-dimensionally uniform matrix structure, and thus has a high strength in the thickness direction and a low thickness change rate. That is, there has been a possibility of hampering the expansion of the negative electrode during charging and discharging and thus of lowering the battery performance.

As the dry method, for example, a method (what is termed a lamellar stretching method) has been developed (for example, refer to Japanese Examined Patent Publication No. 55-32531 and Japanese Laid-open Patent Publication No. 2005-56851) that involves employing low-temperature extrusion and a high draft ratio during melt extrusion to control a lamellar structure, before stretching, in the film that is formed as a sheet, uniaxially stretching the sheet to generate cleavage at a lamellar interface to form pores. However, the porous film obtained with that method has a structure in which the resin lies in the direction perpendicular to the thickness direction, so that the porous film has a low thickness change rate and, thus, there has been a possibility of hampering the expansion of the negative electrode during charging and discharging and thus of lowering the battery performance.

As the dry method, a number of methods have been developed (for example, refer to Japanese Laid-open Patent Publication Nos. 63-199742, 6-100720, 9-255804 and 2008-120931), called β-crystallization, involving using a difference in crystal density and a crystal transition between an α-type crystal (α crystal) and a β-type crystal (β crystal) that are crystal polymorphs of polypropylene to form pores in the film. However, while being easily deformable in the thickness direction, the porous film obtained with that method has a small thickness recovery rate, and has a large change rate in the thickness recovery rate when loading and releasing are repeated several times. Consequently, there have been cases in which the cycle characteristics deteriorate when the porous film is used for the separator.

It could therefore be helpful to provide a porous film that has a high thickness change rate when a load is applied to the porous film and a high thickness recovery rate when operations of loading and releasing are conducted, to provide a separator for an electric storage device that has good cycle characteristics and that can follow expansion and contraction of a negative electrode in a high energy density battery composition, and to provide an electric storage device.

SUMMARY

We thus provide a porous film having through-pores, wherein, when thickness of a circular region having a diameter of 10 mm as an initial thickness $t_0$ after a load of 50 g is applied onto the circular region for 10 seconds, as a thickness t after a load of 500 g is subsequently applied onto the same region for 10 seconds, and as a thickness $t_1$ after 10 seconds has passed after the load applied onto the same region is subsequently changed to 50 g, a thickness change rate (%) expressed by Equation (1) is 10% to 50%, and a thickness ($t_1$) recovery rate (%) expressed by Equation (2) is 80% to 99.9%:

$$\text{Thickness change rate (\%)} = [(t_0-t)/t_0] \times 100 \quad (1), \text{ and}$$

$$\text{Thickness } (t_1) \text{ recovery rate (\%)} = (t_1/t_0) \times 100 \quad (2).$$

When the porous film is used as a separator for a lithium-ion secondary battery, it excels in followability to expansion and contraction of a negative electrode during charging and discharging and in cycle characteristics, and thus can be suitably used as a separator for an electric storage device and as a film for an electric storage device.

DETAILED DESCRIPTION

An example of our film will be described below. As a resin constituting the porous film, any of polyolefin-based resin, polycarbonate resin, polyamide resin, polyimide resin, polyamide-imide, aromatic polyamide resin, and fluorine-based resin can be used. Among them, the polyolefin-based resin is preferable from the viewpoint of heat resistance, formability, reduction in production cost, chemical resistance, oxidation resistance, reduction resistance, and the like. Monomeric components constituting the polyolefin-based resin include, for example, ethylene, propylene, 1-butene, 1-pentene, 3-methyl-1-pentene, 3-methyl-1-butene, 1-hexene, 4-methyl-1-pentene, 5-ethyl-1-hexene, 1-heptene, 1-octene, 1-decene, 1-dodecene, 1-tetradecene, 1-hexadecene, 1-heptadecene, 1-octadecene, 1-eicosene, vinylcyclohexene, styrene, allylbenzene, cyclopentene, norbornene, and 5-methyl-2-norbornene. As the resin constituting the porous film, a homopolymer of the monomer listed above or a copolymer of two or more types of monomers selected from the above-listed monomers is preferably used. However, the resin is not limited to these substances. Other than the above-listed monomeric components, for example, vinyl alcohol or maleic anhydride can be copolymerized or graft-polymerized. However, the components are not limited to these. Among the above-mentioned polymers, the polypropylene resin is preferable from the viewpoint of heat resistance, air permeability, porosity, and the like.

The porous film includes a plurality of through-holes that pass through both surfaces of the film and have air permeability. While either of the wet method and the dry method can be used as a method for forming the through-holes in the porous film, the dry method is preferable because it can simplify the process and, in the case of using the polypropylene resin, β-crystallization is particularly preferable because it provides a large thickness change rate of the porous film when a load is applied thereto.

In the case of using the polypropylene resin as the resin constituting the porous film and forming pores using β-crystallization, the polypropylene resin preferably has a β-crystal forming ability of 30% to 100%. When the β-crystal forming ability is less than 30%, there are cases in which the amount of β crystal is small during film production, so that only a small number of pores are formed in the film using transition to α crystal and, as a result, only a film having low permeability can be obtained. To obtain the β-crystal forming ability in the range of 30% to 100%, it is preferable to use the polypropylene having a high isotactic index, or to add a β-crystal nucleating agent. The β-crystal forming ability is preferably 35% to 100%, and particularly preferably 40% to 100%.

It is important to form a large amount of the β crystal in the polypropylene resin to obtain the β-crystal forming ability in the desirable range described above. For that purpose, it is preferable to use, as an additive into the polyolefin-based resin, a crystallization nucleating agent, called the β-crystal nucleating agent, that selectively forms the β crystal. While various types of pigment-based compounds and amide-based compounds can be candidates for the β-crystal nucleating agent, the amide-based compound disclosed in Japanese Laid-open Patent Publication No. 5-310665 can be particularly preferably used. For example, the following compounds can be preferably used as the amide-based compound: N,N'-dicyclohexyl-2,6-naphthalenedicarboxamide, N,N'-dicyclopentyl-2,6-naphthalenedicarboxamide, N,N'-dicyclooctyl-2,6-naphthalenedicarboxamide, N,N'-dicyclododecyl-2,6-naphthalenedicarboxamide, N,N'-dicyclohexyl-2,7-naphthalenedicarboxamide, N,N'-dicyclohexyl-4,4'-biphenyldicarboxamide, N,N'-dicyclopentyl-4,4'-biphenyldicarboxamide, N,N'-dicyclooctyl-4,4'-biphenyldicarboxamide, N,N'-dicyclododecyl-4,4'-biphenyldicarboxamide, N,N'-dicyclohexyl-2,2'-biphenyldicarboxamide, N,N'-diphenylhexanediamide, N,N'-dicyclohexylterephthalamide, N,N'-dicyclohexanecarbonyl-p-phenylenediamine, N,N'-dibenzoyl-1,5-diaminonaphthalene, N,N'-dibenzoyl-1,4-diaminocyclohexane, N,N'-dicyclohexanecarbonyl-1,4-diaminocyclohexane, N-cyclohexyl-4-(N-cyclohexanecarbonylamino)benzamide, N-phenyl-5-(N-benzoylamino)pentaneamide, and tetraoxaspiro compounds such as 3,9-bis[4-(N-cyclohexylcarbamoyl)phenyl]-2,4,8,10-tetraoxaspiro[5.5]undecane. A mixture of two types or more of the β-crystal nucleating agent can be used. The content of the β-crystal nucleating agent is preferably 0.05 to 0.5 part by mass, and more preferably 0.1 to 0.3 part by mass relative to 100 parts by mass of the polyolefin-based resin (total mixture when a mixture is used).

The polyolefin-based resin constituting the porous film is preferably an isotactic polypropylene (PP-1) having a melt flow rate (hereinafter mentioned as MFR) in the range of 4 to 30 g/10 min. Deviation of the MFR from the above-mentioned preferable range can make it difficult to obtain a biaxially stretched film. The MFR is more preferably 4 to 20 g/10 min.

The polypropylene resin contained in the porous film is preferably the isotactic polypropylene, which preferably has an isotactic index of 90% to 99.9%. An isotactic index of less than 90% makes the resin have low crystallinity, so that it can be difficult to attain high air permeability. A commercially available isotactic polypropylene resin can be used.

When the polyolefin-based resin is used as the resin constituting the porous film, it is preferable, to obtain a thickness ($t_1$) recovery rate (to be described later) within a certain range, to use a polypropylene resin composition (PP-2) that contains the polypropylene resin (PP-1) having an MFR in the range of 4 to 30 g/10 min and a homopolypropylene resin or a propylene-ethylene copolymer (HM-PP) having an MFR of 0.1 to less than 4 g/10 min within certain ranges, or to use a polypropylene resin composition (PP-3) that contains the polypropylene resin (PP-1) having an MFR in the range of 4 to 30 g/10 min and an elastomer (EL) containing at least propylene or butene as a constituent unit within certain ranges. Alternatively, it is also possible to use a polypropylene resin composition (PP-4) that contains the polypropylene resin (PP-1) having an MFR in the range of 4 to 30 g/10 min, the homopolypropylene resin or the propylene-ethylene copolymer (HM-PP) having an MFR of 0.1 to less than 4 g/10 min, and the elastomer (EL) containing at least propylene or butene as a constituent unit within certain ranges.

It is also possible to preferably use a polypropylene resin composition (PP-5) obtained by blending an ethylene-α-olefin copolymer (EO) with the polypropylene resin composition (PP-2) or a polypropylene composition (PP-6) obtained by blending the ethylene-α-olefin copolymer (EO) with the polypropylene resin composition (PP-3). It is further possible to preferably use, as the resin constituting the porous film, a polypropylene composition (PP-7) obtained by blending the polypropylene resin (PP-1) having an MFR in the range of 4 to 30 g/10 min, the homopolypropylene resin or the propylene-ethylene copolymer (HM-PP) having an MFR of 0.1 to less than 4 g/10 min, the elastomer (EL) containing at least propylene or butene as a constituent unit, and the ethylene-α-olefin copolymer (EO) at certain proportions.

It is preferable to employ a heat-setting temperature after stretch in the transverse direction in the range of 155° C. to 165° C., as a film-forming condition for the porous film, and it is preferable to relax the film in the transverse direction by a range of 13% to 35% during the heat setting. Conventionally, while the porous film formed by β-crystallization is easily compressed in the thickness direction when a load is applied to the film, there have been cases in which the recovery rate is insufficient when the load is released. In contrast, the porous film formed by the wet method or the lamellar stretching method has a structure hardly compressible in the thickness direction and can attain a high thickness recovery rate. However, there have been cases in which the thickness change rate can only be insufficiently increased. Both the methods for forming pores have the advantages and the disadvantages, and have not been capable of regulating both the thickness change rate and the thickness recovery rate within preferable ranges. Therefore, as a result of keen studies, a method (conditions) for controlling both the thickness change rate and the thickness recovery rate to be in preferable ranges has been established and, thus, it has been made possible to satisfy, when the porous film is used as a separator for a lithium-ion secondary battery, both the performance to follow expansion and contraction of the negative electrode during charging and discharging, and the cycle characteristics.

Denote the thickness of a circular region having a diameter of 10 mm of the porous film as an initial thickness $t_0$ after a load of 50 g is applied onto the circular region for 10 seconds, and as a thickness t after a load of 500 g is subsequently applied onto the same region for 10 seconds. Then, a thickness change rate (%) expressed by Equation (1) is 10% to 50%:

$$\text{Thickness change rate (\%)} = [(t_0 - t)/t_0] \times 100 \qquad (1).$$

The thickness change rate (%) of the porous film is preferably 20% to 40%. A thickness change rate of less than 10% can hamper the expansion of the negative electrode during charging and discharging of the lithium-ion battery and thus can lower the battery performance when the porous film is used as a separator of the lithium-ion battery. A thickness change rate of more than 50% can raise a separator resistance when the negative electrode expands, and thus satisfactory battery characteristics can fail to be obtained.

To obtain a thickness change rate within the range given above, it is preferable to use the method of forming the through-holes using β-crystallization. The details will be described later.

Suppose that the thickness (initial thickness $t_0$) of the circular region having the diameter of 10 mm of the porous film is measured after a load of 50 g is applied onto the circular region for 10 seconds; then the thickness t is measured after a load of 500 g is subsequently applied onto the same region for 10 seconds; and a thickness $t_1$ is measured after 10 seconds has passed after the load applied onto the same region is subsequently changed to 50 g. Then, the thickness ($t_1$) recovery rate (%) expressed by Equation (2) is 80% to 99.9%:

$$\text{Thickness } (t_1) \text{ recovery rate (\%)} = (t_1/t_0) \times 100 \qquad (2).$$

A thickness ($t_1$) recovery rate (%) of less than 80% can cause the thickness of the separator to be reduced due to the expansion and contraction of the negative electrode during charging and discharging, and thus can cause a short circuit to occur due to particles that have come off or the like, or can raise the separator resistance. While the thickness ($t_1$) recovery rate (%) is preferably as high as possible, the upper limit thereof is practically 99.9%. The thickness ($t_1$) recovery rate (%) of the porous film is preferably 88% to 99.9%, and more preferably 90% to 99.9%.

To regulate the thickness ($t_1$) recovery rate (%) of the porous film within the range given above, it is preferable to use, as the resin composition, the polypropylene resin composition (PP-2) obtained by blending 70% to 99% by mass of the polypropylene resin (PP-1) having an MFR in the range of 4 to 30 g/10 min with 1% to 30% by mass of the homopolypropylene resin or the propylene-ethylene copolymer (HM-PP) having an MFR of 0.1 to less than 4 g/10 min at the above-mentioned proportions. By using the polypropylene resin composition (PP-2) obtained by blending the polypropylene resin (PP-1) with the homopolypropylene resin or the propylene-ethylene copolymer (HM-PP) at predetermined proportions, a high thickness recovery rate can be maintained not only for the thickness recovery rate after a load application operation (one cycle) of applying and releasing a load to the porous film, but also for the thickness recovery rate after a plurality of cycles (100 cycles) of the load application operation. When the blending amount of the homopolypropylene resin or the propylene-ethylene copolymer (HM-PP) having a low MFR is less than 1% by mass, the recovery of the thickness can be insufficient. When, by contrast, the blending amount exceeds 30% by mass, the pores of the porous film can be hampered from opening and, thus, the degree of air permeability can deteriorate. The blending amount of the homopolypropylene resin or the propylene-ethylene copolymer (HM-PP) having a low MFR is more preferably 3% to 20% by mass.

As the homopolypropylene resin or the propylene-ethylene copolymer (HM-PP) described above, it is possible to use, for example, polypropylene resin PB222A produced by SunAllomer Ltd., polypropylene resin D101 produced by Sumitomo Chemical Co., Ltd., or polypropylene resin E111G, B241, or E105GM produced by Prime Polymer Co., Ltd.

Moreover, to regulate the thickness ($t_1$) recovery rate of the porous film within the range given above, it is more preferable to use the polypropylene resin composition (PP-5) obtained by making a blend in the range of 60% to 98% by mass of the polypropylene resin (PP-1) having an MFR in the range of 4 to 30 g/10 min, 1% to 30% by mass of the homopolypropylene resin or the propylene-ethylene copolymer (HM-PP) having an MFR of 0.1 to less than 4 g/10 min, and 1% to 10% by mass of the ethylene-α-olefin copolymer (EO).

Blending the ethylene-α-olefin copolymer is particularly effective to maintain high values of the thickness recovery rate (%) after the load application operation (one cycle) and the thickness recovery rate after a plurality of cycles (100 cycles) of the load application operation while maintaining high air permeability, and easily makes it possible to simultaneously satisfy characteristics as a separator. In the polypropylene resin composition (PP-5) containing the two types of resins described above, the above-described effect is considered to appear because the high-strength resins provide support between highly cleaved fibrils. The ethylene-α-olefin copolymer is preferably an ultralow density polyethylene having a density of 0.89 or less. Above all, an ethylene-1-octene copolymer obtained by copolymerization with 1-octene can be particularly preferably used. As this polyethylene copolymer resin, a commercially available resin can be exemplified, for example, "Engage (registered trademark)" (Type: 8411, 8452, 8100, etc.) produced by Dow Chemical Company.

In addition, to regulate the thickness ($t_1$) recovery rate within the range given above, it is preferable, from the viewpoint of giving rubber elasticity, to use the polypropylene resin composition (PP-3) obtained by making a blend in the range of 80% to 99% by mass of the polypropylene resin (PP-1) having an MFR in the range of 4 to 30 g/10 min and 1 to 20 parts by mass of the elastomer (EL) containing at least propylene or butene as a constituent unit. Using the polypropylene resin composition (PP-3) makes it possible to maintain a high thickness recovery rate not only for the thickness recovery rate (%) after the load application operation (one cycle) but also for the thickness recovery rate after a plurality of cycles (100 cycles) of the load application operation to the porous film. When the blending amount of the elastomer (EL) is less than 1% by mass, the recovery of the thickness can be insufficient. When, by contrast, the blending amount exceeds 30% by mass, the pores of the porous film can be hampered from opening and, thus, the degree of air permeability can deteriorate. The blending amount of the elastomer (EL) containing at least propylene or butene as a constituent unit is more preferably 2% to 10% by mass. As the elastomer (EL), for example, a propylene-butene copolymer consisting primarily of propylene or a butene-propylene copolymer consisting primarily of butene can be exemplified from the viewpoint of compatibility with polypropylene, and above all, for example, "Notio" produced by Mitsui Chemicals, Inc. or "Toughmer" produced by Mitsui Chemicals, Inc. can be preferably used.

Furthermore, to regulate the thickness ($t_1$) recovery rate within the range given above, it is more preferable to use the polypropylene composition (PP-6) obtained by making a blend in the range of 70% to 98% by mass of the polypropylene resin (PP-1) having an MFR in the range of 4 to 30 g/10 min, 1% to 20% by mass of the elastomer (EL) containing at least propylene or butene as a constituent unit, and 1% to 10% by mass of the ethylene-α-olefin copolymer. Blending the ethylene-α-olefin copolymer while containing the elastomer is particularly effective to maintain high values of the thickness recovery rate (%) after the load application operation (one cycle) and the thickness recovery rate after a plurality of cycles (100 cycles) of the load application operation, and easily makes it possible to simultaneously satisfy characteristics as a separator. In the polypropylene resin composition (PP-6) obtained by simultaneously blending the two types of materials described above, the effect is considered to appear because the elasticity is given between excessively cleaved fibrils. The same ethylene-α-olefin copolymer as that used in the polypropylene resin composition (PP-5) can be used as the ethylene-α-olefin copolymer blended in the polypropylene resin composition (PP-6).

It is preferable to stretch the above-described polypropylene resin composition in the machine direction and the transverse direction under predetermined conditions, and then employ the temperature in the range of 155° C. to 165° C. as the heat-setting temperature after the stretch in the transverse direction. The thickness ($t_1$) recovery rate can be regulated within the range given above by relaxing the film in the transverse direction by the range of 13% to 35% during the heat setting. Regulating the heat-setting temperature within the above-described range is considered to increase the degree of crystallinity of the fibrils of the porous film, and thus to increase the elastic modulus of the fibrils.

In addition, regulating the relaxation rate within the above-described range is considered to reduce the degree of flatness of the pores flatly widened in the transverse direction, and also to relax the orientation in the plane to obtain a structure that hardly buckles. The heat-setting temperature after the stretch in the transverse direction is preferably 159° C. to 165° C., and more preferably 161° C. to 165° C. The relaxation rate in the transverse direction of the film during the heat setting is preferably 15% to 25%, and more preferably 20% to 25%. Forming a film from the above-described polypropylene resin composition at the predetermined values of the heat-setting temperature and the relaxation rate makes it possible to obtain an unexpected effect of being capable of satisfying both the thickness change rate and the thickness ($t_1$) recovery rate of the porous film that are normally traded off against each other. This effect is considered to be brought about by the high air permeability, the giving of the rubber elasticity, and the high strength that are attained by the predetermined material prescriptions, and also by the increase in the elastic modulus of the fibrils and the hardly buckling pore structure that are obtained by employing the predetermined heat-setting conditions, as described above for the respective factors.

Suppose that the thickness (initial thickness $t_0$) of the circular region having the diameter of 10 mm of the porous film is measured after a load of 50 g is applied onto the circular region for 10 seconds and, subsequently, a thickness ($t_{100}$) is measured after repetition, by 100 cycles, of an operation of alternately applying a load of 500 g and a load of 50 g for 10 seconds each onto the same region. Then, the change rate (%) in the thickness ($t_{100}$) recovery rate expressed by Equation (3) is preferably 0.1% to 20%:

$$\text{Change rate (\%) in thickness } (t_{100}) \text{ recovery rate} = [(t_1 - t_{100})/t_1] \times 100 \quad (3).$$

Note that thickness ($t_{100}$) recovery rate=($t_{100}/t_0$)×100.

When the change rate in the thickness ($t_{100}$) recovery rate exceeds 20%, the separator resistance can gradually increase relative to an initial value and, thus, the cycle characteristics can deteriorate. While the change rate in the thickness ($t_{100}$) recovery rate is preferably as low as possible, the lower limit thereof is practically 0.1%. The change rate in the thickness ($t_{100}$) recovery rate of the porous film is more preferably in the range of 0.1% to 10%.

To regulate the change rate in the thickness ($t_{100}$) recovery rate within the range given above, it is preferable, as described above, to use the polypropylene resin composition (PP-2) containing the polypropylene resin (PP-1) having an MFR of 4 to 30 g/10 min and the homopolypropylene resin or the propylene-ethylene copolymer (HM-PP) having an MFR of 0.1 to less than 4 g/10 min within certain ranges, or to use the polypropylene resin composition (PP-3) containing the polypropylene resin (PP-1) having an MFR in the range of 4 to 30 g/10 min and the elastomer (EL) containing at least propylene or butene as a constituent unit within certain ranges. It is more preferable to use the polypropylene resin composition (PP-5) obtained by blending the ethylene-α-olefin copolymer (EO) with the polypropylene resin composition (PP-2) or the polypropylene composition (PP-6) obtained by blending the ethylene-α-olefin copolymer (EO) with the polypropylene resin composition (PP-3).

To regulate the change rate in the thickness ($t_{100}$) recovery rate of the porous film within the range given above, it is particularly preferable to use the polypropylene resin composition (PP-7) obtained by blending the polypropylene resin (PP-1) having an MFR in the range of 4 to 30 g/10 min, the homopolypropylene resin or the propylene-ethylene copolymer (HM-PP) having an MFR of 0.1 to less than 4 g/10 min, the elastomer (EL) containing at least propylene or butene as a constituent unit, and the ethylene-α-olefin copolymer (EO) at certain proportions.

To regulate the change rate in the thickness ($t_{100}$) recovery rate within the range given above, it is also preferable to employ the heat-setting temperature in the range of 155° C. to 165° C. as the film-forming condition for the above-described polypropylene resin composition, and to relax the film in the transverse direction by the range of 13% to 35% during the heat setting. The heat-setting temperature after the stretch in the transverse direction is preferably 159° C. to 165° C., and more preferably 161° C. to 165° C. The relaxation rate in the transverse direction of the film during the heat setting is preferably 15% to 25%, and more preferably 20% to 25%.

To be used for such applications as a separator of a battery, the porous film is desirable to have high air permeability, and desirable to maintain the high air permeability after being repeatedly charged and discharged. Consequently, from the viewpoint of internal resistance of a battery, Gurley air permeability ($G_0$) in an initial state in which no load is applied is preferably 10 to 600 s/100 ml, and more preferably 50 to 300 s/100 ml. If the initial Gurley air permeability ($G_0$) value is less than 10 s/100 ml, the strength of the film can be reduced, and thus metallic lithium deposited on the negative electrode can pass through the porous film to produce a short circuit in the lithium-ion secondary battery, thus causing a problem. If the initial Gurley air permeability ($G_0$) value exceeds 600 s/100 ml, the battery can have high internal resistance due to low air permeability, thus making it impossible to obtain a high output density.

Denote the Gurley air permeability as $G_0$ in the initial state in which no load is applied, and denote the Gurley air permeability as $G_{100}$ after repetition, by 100 cycles, of an operation of alternately applying a load of 0.64 g/mm$^2$ and a load of 6.4 g/mm$^2$ for 10 seconds each. Then, the change rate (%) in the Gurley air permeability expressed by Equation (4) is preferably 0% to 20% from the viewpoint of maintaining the output density of the battery:

$$\text{Change rate (\%) in Gurley air permeability} = (|G_0 - G_{100}|/G_0) \times 100 \qquad (4).$$

When the change rate in the Gurley air permeability exceeds 20%, the output density can fail to be maintained, so that excellent cycle characteristics cannot be obtained. The change rate in the Gurley permeability of the porous film is more preferably 0% to 10%.

To regulate the initial Gurley air permeability ($G_0$) within the range given above, it is preferable, from the viewpoint of facilitating the opening of the pores during the stretching, to add 1% to 10% by mass of the ethylene-α-olefin copolymer (EO) into the polypropylene resin composition. The same ethylene-α-olefin copolymer as that used in the polypropylene resin composition (PP-5) can be used as the ethylene-α-olefin copolymer added to the polypropylene resin composition.

Furthermore, to regulate the change rate in the Gurley air permeability within the range given above, the predetermined amount of the ethylene-α-olefin copolymer (EO) is preferably added to the polypropylene resin composition and, in addition, the change rate in the thickness ($t_{100}$) recovery rate is regulated preferably within the range of 0.1% to 20% and more preferably within the range of 0.1% to 10%. The above-given range of the change rate in the Gurley air permeability can be attained by further heat-setting the stretched polypropylene resin composition at a temperature of 155° C. to 165° C. as the film-forming condition.

From the viewpoint of the cycle characteristics, the porous film preferably has a heat shrinkage factor (at 120° C. in one hour) of 0.1% to 3% in the transverse direction of the porous film. When the heat shrinkage factor in the transverse direction of the porous film at 120° C. in one hour is less than 0.1%, anisotropy of orientation can be reduced, so that a reduction in strength in the transverse direction can occur, and the porous film can tear easily. When the heat shrinkage factor exceeds 3%, rising of temperature in the battery can produce a short circuit between electrodes, and thus can deteriorate the cycle characteristics. The heat shrinkage factor in the transverse direction of the porous film at 120° C. in one hour is more preferably 0.2% or more, still more preferably 0.3% or more, and particularly preferably 0.4% or more. The heat shrinkage factor in the transverse direction of the porous film at 120° C. in one hour is more preferably 2.5% or less, still more preferably 2% or less, and particularly preferably 1.5% or less.

To regulate the heat shrinkage factor in the transverse direction of the porous film at 120° C. in one hour within the range given above, it is preferable to employ a temperature of 156° C. to 165° C. as the heat-setting temperature after the stretch in the transverse direction, and the film is relaxed in the transverse direction during the heat setting preferably by 13% to 35%, and more preferably by 15% to 25%.

From the viewpoint of improvement in film-forming properties, a high melt strength polypropylene may be blended in the above-described polypropylene resin composition by 0.5% to 5% by mass. The high melt strength polypropylene is a polypropylene with tensile strength in a melt state increased by mixing a high molecular weight component or a component having a branched structure, or by copolymerizing a long-chain branched component with the polypropylene. Among others, the polypropylene copolymerized with the long-chain branched component is preferably used. The high melt strength polypropylene is commercially available, and it is possible to use, for example, polypropylene resin PF814, PF633, or PF611 produced by Basell, polypropylene resin WB130HMS produced by Borealis, or polypropylene resin D114 or D206 produced by Dow can be used.

Unless the desired effects are impaired, the porous film may contain various additives such as an antioxidant, a thermal stabilizer, an antistatic agent, a lubricant composed of inorganic or organic particles, an anti-blocking agent, a filler, and an immiscible polymer. In particular, to suppress oxidative degradation of the polypropylene caused by thermal history, the porous film is preferable to contain the antioxidant at a rate of 0.01 to 0.05 part by mass per 100 parts by mass of the polypropylene resin composition.

The porous film may be laminated at least on one side thereof with a layer having through-pores to give various effects. The lamination constitution may be two-layer lamination or three-layer lamination, or may be that of a larger number of layers. The method of lamination may be any of methods such as a feed block method and a multi-manifold method by coextrusion, and a method in which the porous films are bonded to each other by lamination. It is particularly preferable to laminate layers that do not contain the ethylene-α-olefin copolymer and are formed with the pores using β-crystallization, for example, to improve workability of the porous film.

A method of manufacturing the porous film will be specifically described below. Note that the method of manufacturing the porous film is not limited to this method.

A material (A) is prepared by blending 99.5 parts by mass of the commercially available polypropylene resin (PP-1) having an MFR of 4 to 30 g/10 min as the polypropylene resin, 0.3 part by mass of the N,N'-dicyclohexyl-2,6-naphthalenedicarboxamide as the β-crystal nucleating agent, and 0.2 part by mass of the antioxidant, and by mixing the blend in advance at predetermined proportions using a twin-screw extruder. At this time, the melting temperature is preferably 270° C. to 300° C.

In a similar manner, a material (B) is prepared by blending 69.8 to 90 parts by mass of the above-described polypropylene resin (PP-1), 9.8 to 30 parts by mass of the ultralow density polyethylene resin (ethylene-octene-1 copolymer, EO) having an MFR of 18 g/10 min, which is also commercially available, and 0.2 part by mass of the antioxidant, and by mixing the blend in advance at predetermined proportions using the twin-screw extruder.

In addition, a material (C) is prepared by blending 69.8 to 90 parts by mass of the above-described polypropylene resin (PP-1), 9.8 to 30 parts by mass of the random polypropylene resin (HM-PP) having an MFR of 0.1 to less than 4 g/10 min, which is also commercially available, and 0.2 part by mass of the antioxidant, and by mixing the blend in advance at predetermined proportions using the twin-screw extruder.

Furthermore, a material (D) is prepared by blending 69.8 to 90 parts by mass of the above-described polypropylene resin (PP-1), 9.8 to 30 parts by mass of the propylene-based elastomer (propylene-butene copolymer, EL) having an MFR of 7 g/10 min, which is also commercially available, and 0.2 part by mass of the antioxidant, and by mixing the blend in advance at predetermined proportions using the twin-screw extruder.

Next, 73 parts by mass of the material (A), 10 parts by mass of the material (B), 10 parts by mass of the material (C), 6.7 parts by mass of the material (D), and 0.3 part by mass of the antioxidant are mixed in a dry blending process, and supplied to a single-screw melt extruder, which melts and extrudes the mixture at 200° C. to 230° C. Then, foreign matter, modified polymers, and the like are removed by a filter placed midway in a polymer tube, and thereafter, the resultant mixture is discharged from a T-die onto a casting drum to obtain an unstretched sheet. At this time, the casting drum preferably has a surface temperature of 105° C. to 130° C. from the viewpoint of controlling the β-crystal fraction of the cast film high. Forming of particularly edges of the sheet affects the stretchability at a later time. Therefore, it is preferable at this time to blow spot air onto the edges to closely attach the edges onto the drum. In addition, depending on the state of close contact of the entire sheet with the drum, an air knife may be used to blow air onto the whole surface as required.

Next, the obtained unstretched sheet is biaxially oriented, and voids are formed in the film. As a method for the biaxial orientation, various methods can be used such as a sequential biaxial stretching method in which the film is stretched in the machine direction and thereafter in the transverse direction, or in the transverse direction and thereafter in the machine direction, or a simultaneous biaxial stretching method in which the film is nearly simultaneously stretched in the machine direction and in the transverse direction. From the point of ease of obtaining a highly air-permeable film, it is preferable to employ the sequential biaxial stretching method, and particularly preferable to stretch the film in the machine direction and thereafter in the transverse direction.

With respect to specific stretching conditions, first, the unstretched sheet is controlled at a temperature to be stretched in the machine direction. The method of controlling the temperature can employ a method of using a temperature-controlled rotating roller, a method of using a hot-air oven, or the like. As the temperature of stretching in the machine direction, it is preferable to employ a temperature of 90° C. to 140° C., more preferable to employ a temperature of 110° C. to 130° C., and particularly preferable to employ a temperature of 121° C. to 130° C. The draw ratio is preferably 3 to 6, and more preferably 3 to 5.8.

Although increasing the draw ratio provides higher porosity, stretching the film to a draw ratio in excess of 6 can cause film breakage to be likely to occur in the succeeding transverse stretching process. When the film is stretched in the machine direction, a phenomenon called neck-down is observed in which the film width decreases. To achieve high air permeability, the neck-down ratio (film width after stretching/film width before stretching×100) is preferable to be 40% to 90%. The neck-down ratio is more preferable to be 50% to 80%, considering the stretching in the transverse direction.

Next, the film is introduced into a tenter stretching machine with the edges thereof held. Then the film is heated to preferably 130° C. to 155° C., and more preferably 145° C. to 153° C., and stretched in the transverse direction by a factor of preferably 4 to 12, more preferably 6 to 11, and still more preferably 6.5 to 10. The stretching at this time is performed at a transverse stretching rate of preferably 500 to 6000%/min, and more preferably 1000 to 5000%/min. Thereafter, the heat setting is performed continuously in the tenter, and the temperature of the heat setting is preferably 155° C. to 165° C., more preferably 159° C. to 165° C., and still more preferably 161° C. to 165° C. Furthermore, the heat setting may be performed while the film is relaxed in the machine direction and/or in the transverse direction, and in particularly, the relaxation rate in the transverse direction is preferably 13% to 35%, more preferably 15% to 25%, and still more preferably 20% to 25% from the viewpoint of the thickness recovery rate, the change rate in the thickness recovery rate, and thermal dimensional stability.

The porous film has a high thickness change rate when a load is applied and a high thickness recovery rate after the load application operation of applying and releasing a load, and maintains the high thickness recovery rate after a plurality of cycles of the load application operation. Therefore, the porous film can be used for applications of packaging products, sanitary products, agricultural supplies, building supplies, medical supplies, separation membranes, optical diffusion plates, and reflective sheets, and can be particularly preferably used as a separator of an electric storage device.

A nonaqueous electrolyte secondary battery typified by a lithium-ion secondary battery and an electric double layer capacitor such as a lithium-ion capacitor can be exemplified as the electric storage device. The electric storage device such as those described above can be repeatedly used by being charged and discharged, and thus can be used as a power supply unit of industrial equipment, living equipment, an electric vehicle, a hybrid electric vehicle, and the like. When the porous film is used as the separator, the output density can be improved, and productivity of the battery can also be improved. The porous film can also be suitably used as a base material for coating.

EXAMPLES

Our films, separators and methods will be described in detail below by way of examples. The properties were measured and evaluated by the following method.

(1) Thickness Change Rate

A standard gauge head having a 10 mm diameter flat shape was attached to a dial gauge (upright dial gauge R1-A made by Ozaki Mfg. Co., Ltd.). Then, measurements were made for the initial thickness $t_0$ (μm) after a load of 50 g (approx. 0.64 g/mm$^2$) is applied for 10 seconds and for the thickness t (μm) after a load of 500 g (approx. 6.4 g/mm$^2$) is applied for 10 seconds. The thickness change rate was obtained using the following equation:

Thickness change rate (%)=[$(t_0-t)/t_0$]×100.

Each thickness measurement was made at the time when 10 seconds had passed from when the load had started to be applied (while the load was being applied). Weights of 50 g and 450 g were used, and the load of 500 g was applied by adding the weight of 450 g to the load of 50 g. The thickness was read at the time when 10 seconds had passed from when the load had started to be applied, and the load was changed immediately after the thickness was read. The measurement position was changed, and the measurements were made at 10 points. The average value of the measurements was taken as the thickness change rate.

(2) Thickness ($t_1$) Recovery Rate

The standard gauge head having a 10 mm diameter flat shape was attached to the dial gauge (upright dial gauge R1-A made by Ozaki Mfg. Co., Ltd.). Then, measurements were made for the initial thickness $t_0$ (μm) after the load of 50 g (approx. 0.64 g/mm$^2$) is applied for 10 seconds and for the thickness $t_1$ (μm) after a load of 500 g (approx. 6.4 g/mm$^2$) is applied for 10 seconds, and then the load was returned to 50 g and left at rest for 10 seconds. The thickness ($t_1$) recovery rate was obtained using the equation given below. The timing of the measurements, the timing of the load changes, and the weights used are the same as those of (1) described above.

Thickness ($t_1$) recovery rate (%)=($t_1/t_0$)×100

The measurement position was changed, and the measurements were made at 10 points. The average value of the measurements was taken as the thickness ($t_1$) recovery rate.

(3) Change Rate in Thickness ($t_{100}$) Recovery Rate

In (2) above, the thickness $t_{100}$ was measured after repetition, by 100 cycles, of the operation of alternately applying the load of 500 g and the load of 50 g for 10 seconds each. The change rate in the thickness ($t_{100}$) recovery rate was obtained from the equation given below, using $t_0$ and $t_1$ measured in (1) and (2). The timing of the measurement, the timing of the load changes, and the weights used are the same as those of (1) described above.

Change rate in thickness ($t_{100}$) recovery rate (%)={$(t_1-t_{100})/t_1$}×100

Note that thickness ($t_{100}$) recovery rate=($t_{100}/t_0$)×100.

(4) Initial Gurley Air Permeability ($G_0$)

A square having a side length of 100 mm was cut out from a film and used as a specimen. Using a Type B Gurley tester of JIS P 8117 (1998), the time for permeation of 100 ml of air was measured three times at 23° C. and a relative humidity of 65%. The average value of the permeation times was taken as the initial Gurley air permeability ($G_0$) of the film.

(5) Change Rate in Gurley Air Permeability

A square having a side length of 100 mm was cut out from a film and interposed between flat glass plates to apply a load of 0.64 g/mm$^2$. Thereafter, a weight was added so that the load became 6.4 g/mm$^2$, and left at rest for 10 seconds. Thereafter, the weight was removed so the load became 0.64 g/mm$^2$ again, and the load was left at rest for 10 seconds. This operation was repeated 10 times, and the resultant film was used as a specimen. Using the Type B Gurley tester of JIS P 8117 (1998), the time for permeation of 100 ml of air was measured three times at 23° C. and a relative humidity of 65%. The average value of the permeation times was taken as the Gurley air permeability ($G_{100}$) of the film. The change rate in the Gurley air permeability was obtained from the following equation, using the Gurley air permeability values measured in the manner described above:

Change rate (%) in Gurley air permeability=($|G_0-G_{100}|/G_0$)×100.

(6) Heat Shrinkage Factor

A porous film was cut out in the transverse direction into a rectangle of 200 mm long×10 mm wide, and used as a sample. Gauge lines were drawn at intervals of 150 mm on the sample, which was then loaded with a hanging weight of 3 g, and placed in a hot-air oven heated to 120° C. for one hour to be heat-treated. After the heat treatment, the sample was left standing to be cooled, and then the distance between the gauge lines was measured. The heat shrinkage factor was calculated from the change in the distance between the gauge lines between before and after the heating. The measurements were made for five samples, and the average value thereof was taken as the heat shrinkage factor of the porous film.

(7) Melt Flow Rate

The melt flow rates of the polypropylene resin, the propylene-ethylene copolymer, and the propylene-based elastomer were measured in accordance with Condition M (230° C., 2.16 kg) of JIS K 7210 (1995). The melt flow rate of the ethylene-octene-1 copolymer was measured in accordance with Condition D (190° C., 2.16 kg) of JIS K 7210 (1995).

(8) β-Crystal Forming Ability

Five milligrams of a porous film was collected as a specimen in an aluminum pan and measured using a differential scanning calorimeter (RDC220 made by Seiko Instruments Inc.). First, the temperature is raised from room temperature to 260° C. at 20° C./min under a nitrogen atmosphere (first run) and, after being held at that temperature for 10 minutes, is cooled to 20° C. at 10° C./min. As to melting peaks observed when the temperature is raised again at 20° C./min (second run) after being held for 5 minutes, a peak of melting lying in a temperature range of 145° C. to 157° C. is regarded as a melting peak of β crystals, and a peak of melting observed at 158° C. or above is regarded as a melting peak of α crystals. The amount of heat of fusion of each crystal type is obtained from the area of a region enclosed by a baseline drawn based on the flat portion on the high-temperature side and the peak. Denoting the amount of heat of fusion of α crystals as ΔHα, and the amount of heat of fusion of β crystals as ΔHβ, the value calculated by the equation given below is taken as the β-crystal forming ability. Indium was used to calibrate the amount of heat of fusion.

β-crystal forming ability (%)=[ΔHβ/(ΔHα+ΔHβ)]× 100

Note that the β-crystal fraction of the film in the state of the specimen can be calculated by calculating in the same manner the abundance ratio of the β crystals from the melting peaks observed in the first run.

Example 1

A mixture was made by mixing materials at proportions of 99.5 parts by mass of homopolypropylene FLX80E4 (MFR: 7.5 g/10 min [Condition M], PP-1) produced by Sumitomo Chemical Co., Ltd. that serves as a material resin of the porous polyolefin film, 0.3 part by mass of N,N'-dicyclohexyl-2,6-naphthalenedicarboxamide (Nu-100 produced by New Japan Chemical Co., Ltd.) that serves as the β-crystal nucleating agent, and a total of 0.2 part by mass including 0.1 part by mass each of IRGANOX1010 and IRGAFOS168 produced by Ciba Specialty Chemicals Inc. that serve as the antioxidants. The mixture was supplied as a material from a scale hopper to the twin-screw extruder, melt-kneaded at 300° C., discharged in strands from a die, cooled to be solidified in a water bath of 25° C., and cut into chips to be produced as a chip material (A).

In addition, a mixture was made by mixing materials at proportions of 69.8 parts by mass of the PP-1, 30 parts by mass of Engage8411 (MFR: 18 g/10 min [Condition D]) produced by Dow Chemical that serves as the ethylene-octene-1 copolymer (EO), and 0.2 part by mass of the antioxidant (Irganox1010/Irgafos168=1/1). The mixture was supplied as a material from the scale hopper to the twin-screw extruder, melt-kneaded at 220° C., discharged in strands from the die, cooled to be solidified in the water bath of 25° C., and cut into chips to be produced as a chip material (B).

Furthermore, a mixture was made by mixing materials at proportions of 69.8 parts by mass of the PP-1, 30 parts by mass of random polypropylene resin PB222A (MFR: 0.8 g/10 min [Condition M], HM-PP) produced by SunAllomer, and 0.2 part by mass of the antioxidant (Irganox1010/Irgafos168=1/1). The mixture was supplied as a material from the scale hopper to the twin-screw extruder, melt-kneaded at 220° C., discharged in strands from the die, cooled to be solidified in the water bath of 25° C., and cut into chips to be produced as a chip material (C).

Furthermore, a mixture was made by mixing materials at proportions of 69.8 parts by mass of the PP-1, 30 parts by mass of propylene-based elastomer XM-7070 (melt flow rate: 7 g/10 min [Condition M], EL) produced by Mitsui Chemicals, and 0.2 part by mass of the antioxidant (Irganox1010/Irgafos168=1/1). The mixture was supplied as a material from the scale hopper to the twin-screw extruder, melt-kneaded at 220° C., discharged in strands from the die, cooled to be solidified in the water bath of 25° C., and cut into chips to be produced as a chip material (D).

Next, a mixture was made by dry-blending 66.3 parts by mass of the material (A), 10 parts by mass of the material (B), 16.7 parts by mass of the material (C), 6.7 parts by mass of the material (D), and 0.3 part by mass of the antioxidant (Irganox1010/Irgafos168=1/2), and supplied to the single-screw melt extruder to be melted and extruded at 220° C. After removal of foreign matter with a 30 μm cut sintered filter, the mixture was discharged from the T-die onto the casting drum with the surface temperature controlled at 120° C., and was cast be in contact with the drum for 15 seconds. Thus, an unstretched sheet was obtained. Then, the sheet was pre-heated using a ceramic roller heated to 122° C., and stretched in the machine direction of the film by a factor of 5. Thereafter, the sheet was introduced into the tenter stretching machine with the edges thereof held by clips, and stretched at 150° C. in the transverse direction by a factor of 6.5 at a stretching rate of 1500%/min. Continuously thereafter, the sheet was relaxed at 159° C. by 20% in the transverse direction, and then heat-treated at 159° C. for 7 seconds. Thus, a porous film having a thickness ($t_0$) of 20 μm was obtained. The measurements were made by the methods described in (1) to (8) given above for the porous polypropylene film of Example 1 produced as described above. Tables 1 and 2 illustrate the results.

Example 2

A porous film was obtained in the same manner as in Example 1 except that the material composition was formed as 79.7 parts by mass of the material (A), 10 parts by mass of the material (B), 10 parts by mass of the material (D), and 0.3 part by mass of the antioxidant (Irganox1010/Irgafos168=1/2), and that the relaxation in the transverse direction was made by 13% with the temperature set to 162° C. at that time. The measurements were made by the methods described in (1) to (8) given above for the porous polypropylene film of Example 2 produced as described above. Tables 1 and 2 illustrate the results.

Example 3

A porous film was obtained in the same manner as in Example 1 except that the material composition was formed as 79.7 parts by mass of the material (A), 10 parts by mass of the material (B), 6.7 parts by mass of the material (C), 3.3 parts by mass of the material (D), and 0.3 part by mass of the antioxidant (Irganox1010/Irgafos168=1/2), and that the relaxation in the transverse direction was made by 13% with the temperature set to 155° C. at that time. The measurements were made by the methods described in (1) to (8) given above for the porous polypropylene film of Example 3 produced as described above. Tables 1 and 2 illustrate the results.

Example 4

A porous film was obtained in the same manner as in Example 1 except that the relaxation in the transverse direction was made by 13% with the temperature set to 155° C. at that time. The measurements were made by the methods described in (1) to (8) given above for the porous polypropylene film of Example 4 produced as described above. Tables 1 and 2 illustrate the results.

Example 5

A porous film was obtained in the same manner as in Example 1 except that the temperature during the relaxation in the transverse direction was set to 165° C. The measurements were made by the methods described in (1) to (8) given above for the porous polypropylene film of Example 5 produced as described above. Tables 1 and 2 illustrate the results.

Example 6

A porous film was obtained in the same manner as in Example 1 except that the material composition was formed as 39.7 parts by mass of the material (A), 10 parts by mass of the material (B), 50 parts by mass of the material (C), and 0.3 part by mass of the antioxidant (Irganox1010/Irgafos168=1/2). The measurements were made by the methods described in (1) to (8) given above for the porous polypropylene film of Example 6 produced as described above. Tables 1 and 2 illustrate the results.

Comparative Example 1

A porous film was obtained in the same manner as in Example 1 except that the material composition was formed as 86.4 parts by mass of the material (A), 10 parts by mass of the material (B), 3.3 parts by mass of the material (C), and 0.3 part by mass of the antioxidant (Irganox1010/Irgafos168=1/2), and that the temperature during the relaxation in the transverse direction was set to 166° C. The measurements were made by the methods described in (1) to (8) given above for the porous polypropylene film of Comparative Example 1 produced as described above. Tables 1 and 2 illustrate the results.

Comparative Example 2

A porous film was obtained in the same manner as in Example 1 except that the relaxation in the transverse direction was made by 5% with the temperature set to 155° C. at that time. The measurements were made by the methods described in (1) to (8) given above for the porous polypropylene film of Comparative Example 2 produced as described above. Tables 1 and 2 illustrate the results.

Comparative Example 3

A porous film was obtained in the same manner as in Example 1 except that the relaxation in the transverse direction was made by 38%. The measurements were made by the methods described in (1) to (8) given above for the porous polypropylene film of Comparative Example 3 produced as described above. Tables 1 and 2 illustrate the results.

Comparative Example 4

A porous film was obtained in the same manner as in Example 1 except that the relaxation in the transverse direction was made by 5%. The measurements were made by the methods described in (1) to (8) given above for the porous polypropylene film of Comparative Example 4 produced as described above. Tables 1 and 2 illustrate the results.

Comparative Example 5

A porous film was obtained in the same manner as in Example 1 except that the relaxation in the transverse direction was made by 25% with the temperature set to 150° C. at that time. The measurements were made by the methods described in (1) to (8) given above for the porous polypropylene film of Comparative Example 5 produced as described above. Tables 1 and 2 illustrate the results.

Comparative Example 6

A porous film was obtained in the same manner as in Example 1 except that the material composition was formed as 89.7 parts by mass of the material (A), 10 parts by mass of the material (B), and 0.3 part by mass of the antioxidant (Irganox1010/Irgafos168=1/2). The measurements were made by the methods described in (1) to (8) given above for the porous polypropylene film of Comparative Example 6 produced as described above. Tables 1 and 2 illustrate the results.

Comparative Example 7

A porous film was obtained in the same manner as in Example 1 except that the material composition was formed as 89.7 parts by mass of the material (A), 10 parts by mass of the material (B), and 0.3 part by mass of the antioxidant (Irganox1010/Irgafos168=1/2), and that the relaxation in the transverse direction was made by 5% with the temperature set to 155° C. at that time. The measurements were made by the methods described in (1) to (8) given above for the porous polypropylene film of Comparative Example 7 produced as described above. Tables 1 and 2 illustrate the results.

TABLE 1

| | Thickness change rate (%) | Thickness ($t_1$) recovery rate (%) | Change rate (%) in thickness ($t_{100}$) recovery rate | Initial Gurley air permeability ($G_0$) (s/100 ml) | Change rate (%) in Gurley air permeability ($G_{100}$) | Heat shrinkage factor (%) in transverse direction | β-crystal forming ability (%) |
|---|---|---|---|---|---|---|---|
| Example 1 | 20 | 95 | 8 | 210 | 4 | 2.0 | 90 |
| Example 2 | 25 | 88 | 9 | 350 | 8 | 2.2 | 90 |
| Example 3 | 30 | 85 | 20 | 120 | 18 | 4.2 | 91 |
| Example 4 | 20 | 92 | 13 | 150 | 15 | 3.8 | 90 |
| Example 5 | 21 | 96 | 6 | 500 | 4 | 0.6 | 90 |
| Example 6 | 16 | 97 | 6 | 480 | 2 | 1.8 | 90 |
| Comp. Ex. 1 | 8 | 99 | 22 | 1000 | 1 | 0.5 | 91 |
| Comp. Ex. 2 | 28 | 75 | 35 | 150 | 22 | 6.2 | 90 |
| Comp. Ex. 3 | 6 | 91 | 10 | 800 | 3 | 0.3 | 90 |
| Comp. Ex. 4 | 26 | 78 | 31 | 180 | 20 | 5.0 | 90 |
| Comp. Ex. 5 | 18 | 75 | 28 | 200 | 19 | 3.2 | 90 |
| Comp. Ex. 6 | 34 | 73 | 25 | 170 | 18 | 2.3 | 91 |
| Comp. Ex. 7 | 42 | 70 | 38 | 100 | 36 | 6.8 | 91 |

TABLE 2

| | Amount (% by mass) of homopolypropylene resin or propylene-ethylene copolymer having MFR of 0.1 to 4 g/10 min | Amount (% by mass) of elastomer containing at least propylene or butene as constituent unit | Amount (% by mass) of ethylene-α-olefin copolymer | Heat-setting temperature (° C.) | Relaxation rate (%) in transverse direction |
|---|---|---|---|---|---|
| Example 1 | 5 | 2 | 3 | 159 | 20 |
| Example 2 | 0 | 3 | 3 | 162 | 13 |
| Example 3 | 2 | 1 | 3 | 155 | 13 |
| Example 4 | 5 | 2 | 3 | 155 | 13 |
| Example 5 | 5 | 2 | 3 | 165 | 20 |
| Example 6 | 15 | 0 | 3 | 159 | 20 |
| Comp. Ex. 1 | 1 | 0 | 3 | 166 | 20 |
| Comp. Ex. 2 | 5 | 2 | 3 | 155 | 5 |
| Comp. Ex. 3 | 5 | 2 | 3 | 159 | 38 |
| Comp. Ex. 4 | 5 | 2 | 3 | 159 | 5 |
| Comp. Ex. 5 | 5 | 2 | 3 | 150 | 25 |
| Comp. Ex. 6 | 0 | 0 | 3 | 159 | 20 |
| Comp. Ex. 7 | 0 | 0 | 3 | 155 | 5 |

INDUSTRIAL APPLICABILITY

The porous film can be provided as a porous film that, when used as a separator for a lithium-ion battery, excels in separator followability to expansion and contraction of an electrode during charging and discharging, and also excels in charging and discharging cycle characteristics.

The invention claimed is:

1. A porous film having through-pores, containing:
a polyolefin-based resin is a polypropylene resin having a melt flow rate of 4 to 30 g/10 min; and
70% to 99% by mass of the polypropylene resin having the melt flow rate of 4 to 30 g/10 min and 1% to 30% by mass of a propylene-ethylene copolymer having a melt flow rate of 0.1 to less than 4 g/10 min; or
80% to 99% by mass of the polypropylene resin having the melt flow rate of 4 to 30 g/10 min and 1% to 20% by mass of an elastomer containing at least propylene or butane as a constituent unit, wherein,
when thickness of a circular region having a diameter of 10 mm as an initial thickness t0 after a load of 50 g is applied onto the circular region for 10 seconds, as a thickness t after a load of 500 g is subsequently applied onto the same region for 10 seconds, and as the thickness $t_1$ after 10 seconds has passed after the load applied onto the same region is subsequently changed to 50 g, a thickness change rate (%) of the film as expressed by Equation (1) is 10% to 50%, and a thickness ($t_1$) recovery rate (%) of the film as expressed by Equation (2) is 80% to 99.9%:

$$\text{Thickness change rate (\%)} = [(t_0 - t)/t_0] \times 100 \quad (1), \text{ and}$$

$$\text{Thickness } (t_1) \text{ recovery rate (\%)} = (t_1/t_0) \times 100 \quad (2).$$

2. The porous film according to claim 1, wherein, when thickness of a circular region having a diameter of 10 mm as an initial thickness $t_0$ after a load of 50 g is applied onto the circular region for 10 seconds, and as a thickness $t_{100}$ after repetition, by 100 cycles, of an operation of alternately applying a load of 500 g and a load of 50 g for 10 seconds each onto the same region, a change rate in a thickness ($t_{100}$) recovery rate of the film as expressed by Equation (3) is 0.1% to 20%:

$$\text{Change rate (\%) in thickness } (t_{100}) \text{ recovery rate} = [(t_1 - t_{100})/t_1] \times 100 \quad (3)$$

where Thickness ($t_{100}$) recovery rate = ($t_{100}/t_0$) × 100.

3. The porous film according to claim 1, wherein, when Gurley air permeability as $G_0$ in an initial state in which no load is applied, and when the Gurley air permeability as $G_{100}$ after repetition, by 100 cycles, of an operation of alternately applying a load of 0.64 g/mm² and a load of 6.4 g/mm² for 10 seconds each onto a predetermined region of the porous film, a change rate in the Gurley air permeability ($G_{100}$) of the film as expressed by Equation (4) is 0% to 20%:

$$\text{Change rate in Gurley air permeability } (G_{100}) = (|G_0 - G_{100}|/G_0) \times 100 \quad (4).$$

4. The porous film according to claim 1, wherein the porous film has a heat shrinkage factor of 0.1% to 3% in a width direction after being heated at 120° C. for one hour.

5. The porous film according to claim 1, wherein the polyolefin-based resin has a β-crystal forming ability of 30% to 100%.

6. The porous film according to claim 1, further containing an ethylene-α-olefin copolymer.

7. A separator for an electric storage device, the separator comprising a porous film having through-pores containing:
a polyolefin-based resin is a polypropylene resin having a melt flow rate of 4 to 30 g/10 min; and
70% to 99% by mass of the polypropylene resin having the melt flow rate of 4 to 30 g/10 min and 1% to 30% by mass of a propylene-ethylene copolymer having a melt flow rate of 0.1 to less than 4 g/10 min; or
80% to 99% by mass of the polypropylene resin having the melt flow rate of 4 to 30 g/10 min and 1% to 20% by mass of an elastomer containing at least propylene or butane as a constituent unit, wherein,
when a thickness of a circular region having a diameter of 10 mm as an initial thickness $t_0$ after a load of 50 g is applied onto the circular region for 10 seconds, as a thickness t after a load of 500 g is subsequently applied onto the same region for 10 seconds, and as the thickness $t_1$ after 10 seconds has passed after the load applied onto the same region is subsequently changed to 50 g, a thickness change rate (%) of the film as expressed by Equation (1) is 10% to 50%, and a thickness ($t_1$) recovery rate (%) of the film as expressed by Equation (2) is 80% to 99.9%:

$$\text{Thickness change rate (\%)} = [(t_0 - t)/t_0] \times 100 \quad (1), \text{ and}$$

$$\text{Thickness } (t_1) \text{ recovery rate (\%)} - (t_1/t_0) \times 100 \quad (2).$$

8. An electric storage device comprising a separator for an electric storage, the separator comprising a porous film having through-pores containing:

a polyolefin-based resin is a polypropylene resin having a melt flow rate of 4 to 30 g/10 min; and 70% to 99% by mass of the polypropylene resin having the melt flow rate of 4 to 30 g/10 min and 1% to 30% by mass of a propylene-ethylene copolymer having a melt flow rate of 0.1 to less than 4 g/10 min; or 80% to 99% by mass of the polypropylene resin having the melt flow rate of 4 to 30 g/10 min and 1% to 20% by mass of an elastomer containing at least propylene or butane as a constituent unit, wherein, when the thickness of a circular region having a diameter of 10 mm as an initial thickness $t_0$ after a load of 50 g is applied onto the circular region for 10 seconds, as a thickness t after a load of 500 g is subsequently applied onto the same region for 10 seconds, and as a thickness $t_1$ after 10 seconds has passed after the load applied onto the same region is subsequently changed to 50 g, a thickness change rate (%) of the film as expressed by Equation (1) is 10% to 50%, and a thickness ($t_1$) recovery rate (%) of the film as expressed by Equation (2) is 80% to 99.9%:

$$\text{Thickness change rate (\%)} = [(t_0 - t)/t_0] \times 100 \quad (1), \text{ and}$$

$$\text{Thickness } (t_1) \text{ recovery rate (\%)} = (t_1/t_0) \times 100 \quad (2).$$

* * * * *